(12) United States Patent
Aciicmez et al.

(10) Patent No.: US 8,788,841 B2
(45) Date of Patent: *Jul. 22, 2014

(54) REPRESENTATION AND VERIFICATION OF DATA FOR SAFE COMPUTING ENVIRONMENTS AND SYSTEMS

(75) Inventors: Onur Aciicmez, San Jose, CA (US); Jean-Pierre Seifert, Santa Clara, CA (US); Xinwen Zhang, San Jose, CA (US); Afshin Latifi, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 957 days.

This patent is subject to a terminal disclaimer.

(21) Appl. No.: 12/256,773

(22) Filed: Oct. 23, 2008

(65) Prior Publication Data

US 2010/0106976 A1 Apr. 29, 2010

(51) Int. Cl.
*G06F 21/00* (2013.01)
*G06F 17/30* (2006.01)
*G06F 21/56* (2013.01)
*H04L 9/06* (2006.01)

(52) U.S. Cl.
CPC ........ *G06F 17/30516* (2013.01); *G06F 21/565* (2013.01); *H04L 9/0643* (2013.01)
USPC ............... 713/189; 341/51; 380/42; 711/216; 726/27; 705/69; 725/136

(58) Field of Classification Search
CPC ........................... H04L 9/0643; G06F 21/565; G06F 17/30516
USPC .......................................................... 713/189
See application file for complete search history.

(56) References Cited

U.S. PATENT DOCUMENTS

| | | | |
|---|---|---|---|
| 5,659,737 A | 8/1997 | Matsuda | |
| 5,907,619 A | 5/1999 | Davis | |
| 6,480,961 B2 * | 11/2002 | Rajasekharan et al. | 726/27 |
| 6,925,566 B1 * | 8/2005 | Feigen et al. | 713/187 |
| 6,959,384 B1 * | 10/2005 | Serret-Avila | 713/176 |
| 7,028,184 B2 * | 4/2006 | Hind et al. | 713/170 |
| 7,340,602 B2 * | 3/2008 | Serret-Avila | 713/161 |
| 7,574,607 B1 * | 8/2009 | Liu et al. | 713/181 |

(Continued)

OTHER PUBLICATIONS

Wikipedia—The Free Encyclopedia, "RSA," http://en.wikipedia.org/wiki/RSA, downloaded Mar. 23, 2009, 15 pages.

(Continued)

*Primary Examiner* — Hadi Armouche
*Assistant Examiner* — Bryan Wright
(74) *Attorney, Agent, or Firm* — Kenneth L. Sherman, Esq.; Michael Zarrabian, Esq.; Sherman & Zarrabian LLP

(57) ABSTRACT

Techniques for representation and verification of data are disclosed. The techniques are especially useful for representation and verification of the integrity of data (integrity verification) in safe computing environments and/or systems (e.g., Trusted Computing (TC) systems and/or environments). Multiple independent representative values can be determined independently and possibly in parallel for respective portions of the data. The independent representative values can, for example, be hash values determined at the same time for respective distinct portions of the data. The integrity of the data can be determined based on the multiple hash values by, for example, processing them to determine a single hash value that can serve as an integrity value.

36 Claims, 11 Drawing Sheets

(56) References Cited

U.S. PATENT DOCUMENTS

| | | | |
|---|---|---|---|
| 7,620,821 B1* | 11/2009 | Grohoski et al. | 713/189 |
| 7,847,710 B2 | 12/2010 | Aciicmez et al. | |
| 7,873,982 B2* | 1/2011 | Smith et al. | 725/136 |
| 8,224,754 B2* | 7/2012 | Pastusiak et al. | 705/69 |
| 2003/0120949 A1* | 6/2003 | Redlich et al. | 713/200 |
| 2005/0210260 A1* | 9/2005 | Venkatesan et al. | 713/180 |
| 2008/0170686 A1* | 7/2008 | Nemoto et al. | 380/42 |
| 2009/0024826 A1* | 1/2009 | Zhang et al. | 711/216 |
| 2009/0031175 A1* | 1/2009 | Aggarwal et al. | 714/47 |
| 2009/0089337 A1* | 4/2009 | Perlin et al. | 707/200 |

OTHER PUBLICATIONS

Wikipedia—The Free Encyclopedia, "SHA hash functions," http://en.wikipedia.org/wiki/SHA_hash_functions, downloaded Mar. 23, 2009, 19 pages.

Wikipedia—The Free Encyclopedia, "Trusted Computing," http://en.wikipedia.org/wiki/Trusted_Computing, downloaded Mar. 23, 2009, 19 pages.

Wikipedia—The Free Encyclopedia, "Hash function," http://en.wikipedia.org/wiki/Hash_function, downloaded Mar. 23, 2009, 7 pages.

Anonymous, "MMX (instruction set)", Wikipedia, May 29, 2008, pp. 1-3, United States, web.archive.org/web/20080529141420/http://en.wikipedia.org/wiki/MMX_(instruction_set) (last visited Jun. 24, 2013).

Anonymous, " GPGPU General-Purpose Computation Using Graphics Hardware", Proceedings of the 2007 GPGPU Workshop, Oct. 12, 2007, pp. 1-5, United States, web.archive.org/web/20071012003804/http://gpgpu.org/ (last visited Jun. 24, 2013).

Stokes, J., "SIMD architectures", Ars Technica, Mar. 21, 2000, pp. 1-3, United States, arstechnica.com/features/2000/03/simd/2/ (last visited Jun. 24, 2013).

WikiPedia—The Free Encyclopedia, "Java Virtual Machine," http://en.wikipedia.org/wiki/Java_virtual_machine, downloaded on Mar. 9, 2009, 6 pages.

WikiPedia—The Free Encyclopedia, "Data compression," http://en.wikipedia.org/wiki/Data_compression, downloaded on Mar. 9, 2009, 7 pages.

WikiPedia—The Free Encyclopedia, "Booting," http://en.wikipedia.org/wiki/Booting, downloaded on Mar. 9, 2009, 11 pages.

* cited by examiner

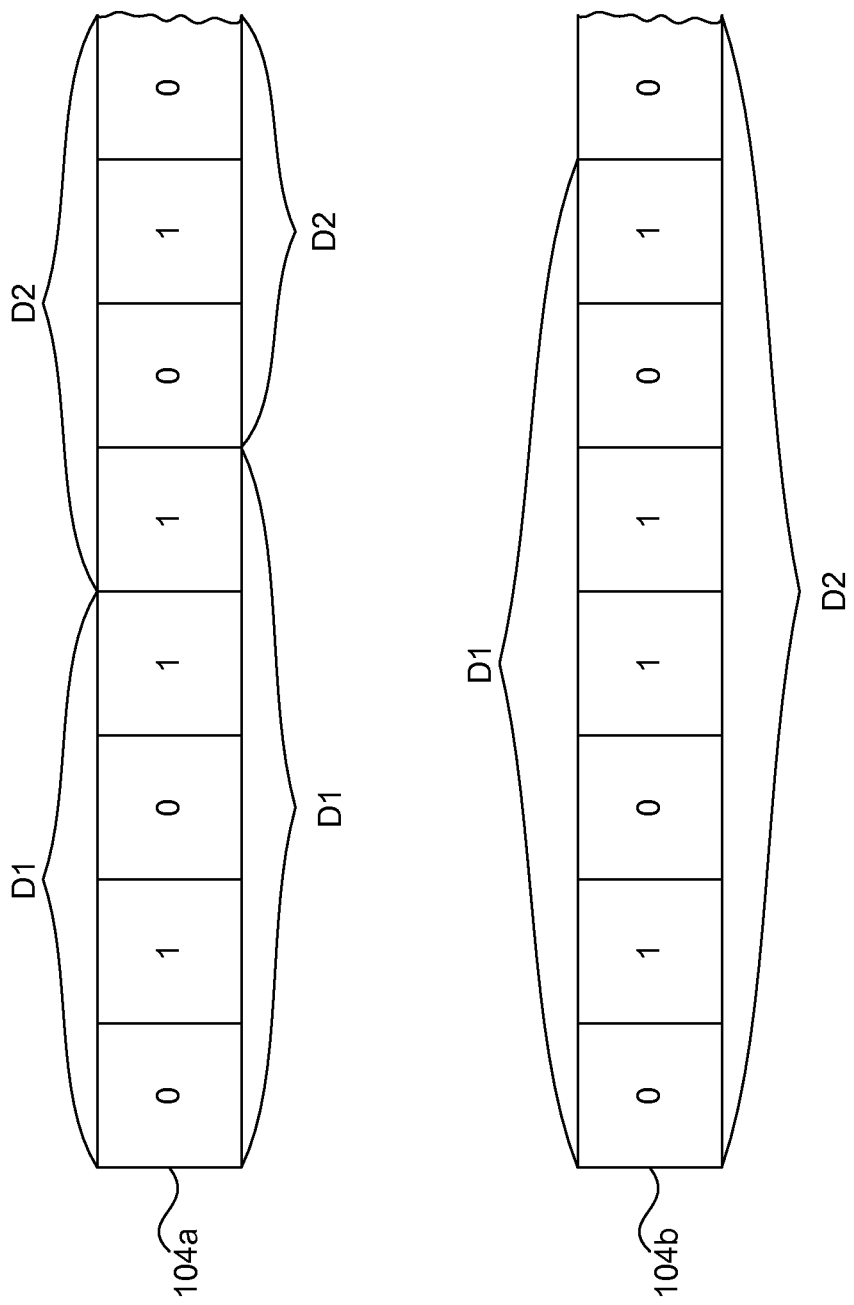

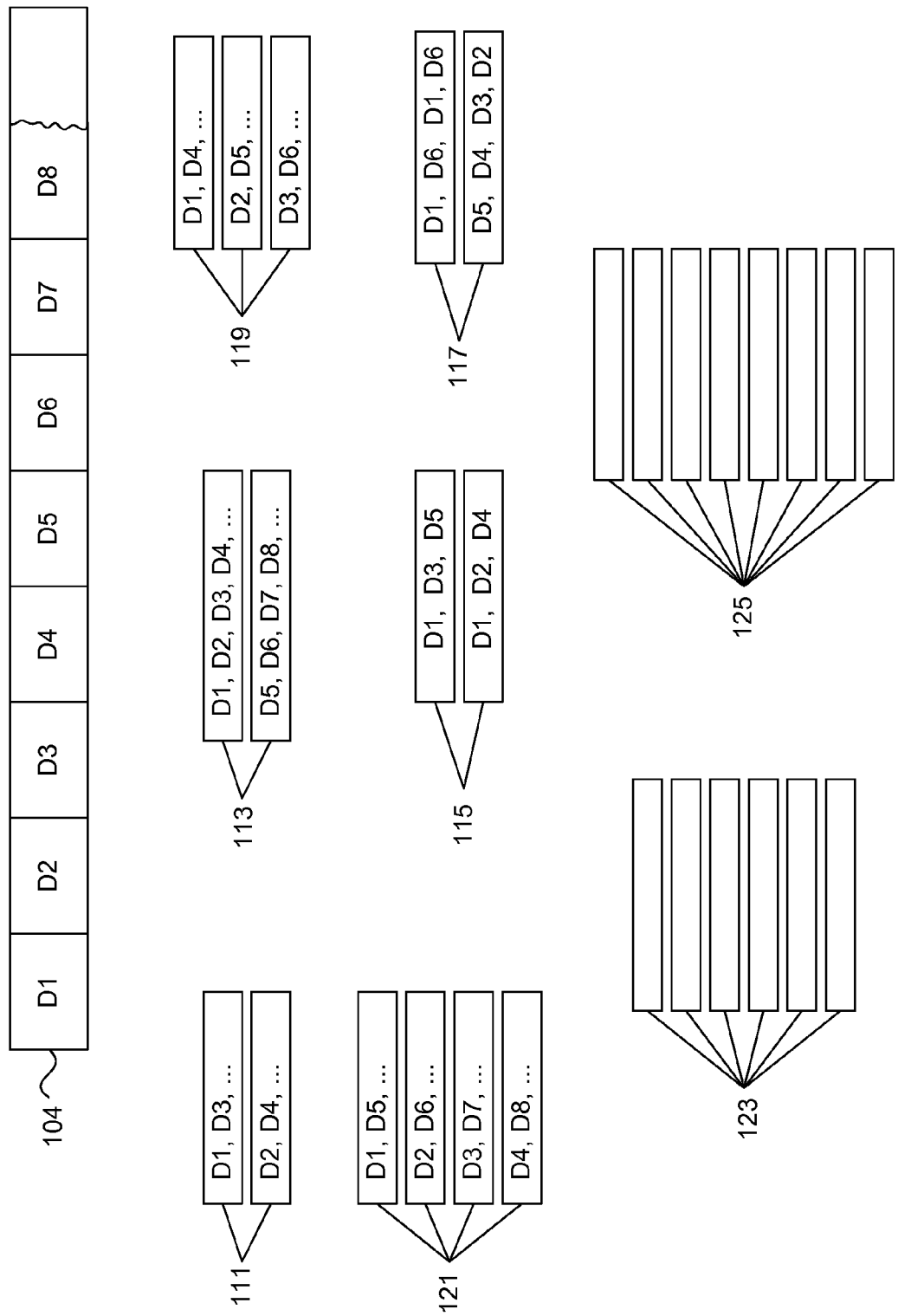

REPRESENTATION AND VERIFICATION OF DATA FOR SAFE COMPUTING ENVIRONMENTS AND SYSTEMS

BACKGROUND OF THE INVENTION

Conceptually, a computing system (e.g., a computing device, a personal computer, a laptop, a Smartphone, a mobile phone) can accept information (content or data) and manipulate it to obtain or determine a result based on a sequence of instructions (or a computer program) that effectively describes how to process the information. Typically, the information is stored in a computer readable medium in a binary form. More complex computing systems can store content including the computer program itself. A computer program may be invariable and/or built into, for example a computer (or computing) device as logic circuitry provided on microprocessors or computer chips. Today, general purpose computers can have both kinds of programming. A computing system can also have a support system which, among other things, manages various resources (e.g., memory, peripheral devices) and services (e.g., basic functions such as opening files) and allows the resources to be shared among multiple programs. One such support system is generally known as an Operating System (OS) which provides programmers with an interface used to access these resources and services.

Today, numerous types of computing devices are available. These computing devices widely range with respect to size, cost, amount of storage and processing power. The computing devices that are available today include: expensive and powerful servers, relatively cheaper Personal Computers (PC's) and laptops and yet less expensive microprocessors (or computer chips) provided in storage devices, automobiles, and household electronic appliances.

In recent years, computing systems have become more portable and mobile. As a result, various mobile and handheld devices have been made available. By way of example, wireless phones, media players, Personal Digital Assistants (PDA's) are widely used today. Generally, a mobile or a handheld device (also known as handheld computer or simply handheld) can be a pocket-sized computing device, typically utilizing a small visual display screen for user output and a miniaturized keyboard for user input. In the case of a Personal Digital Assistant (PDA), the input and output can be combined into a touch-screen interface.

In particular, mobile communication devices (e.g., mobile phones) have become extremely popular. Some mobile communication devices (e.g., Smartphones) offer computing environments that are similar to that provided by a Personal Computer (PC). As such, a Smartphone can effectively provide a complete operating system as a standardized interface and platform for application developers. Given the popularity of mobile communication devices, telecommunication is discussed in greater detail below.

Generally, telecommunication refers to assisted transmission of signals over a distance for the purpose of communication. In earlier times, this may have involved the use of smoke signals, drums, semaphore or heliograph. In modern times, telecommunication typically involves the use of electronic transmitters such as the telephone, television, radio or computer. Early inventors in the field of telecommunication include Alexander Graham Bell, Guglielmo Marconi and John Logie Baird. Telecommunication is an important part of the world economy and the telecommunication industry's revenue is placed at just under 3 percent of the gross world product.

Conventional telephones have been in use for many years. The first telephones had no network but were in private use, wired together in pairs. Users who wanted to talk to different people had as many telephones as necessary for the purpose. Typically, a person who wished to speak, whistled into the transmitter until the other party heard. Shortly thereafter, a bell was added for signaling, and then a switch hook, and telephones took advantage of the exchange principle already employed in telegraph networks. Each telephone was wired to a local telephone exchange, and the exchanges were wired together with trunks. Networks were connected together in a hierarchical manner until they spanned cities, countries, continents and oceans. This can be considered the beginning of the public switched telephone network (PSTN) though the term was unknown for many decades.

Public switched telephone network (PSTN) is the network of the world's public circuit-switched telephone networks, in much the same way that the Internet is the network of the world's public IP-based packet-switched networks. Originally a network of fixed-line analog telephone systems, the PSTN is now almost entirely digital, and now includes mobile as well as fixed telephones. The PSTN is largely governed by technical standards created by the ITU-T, and uses E.163/E.164 addresses (known more commonly as telephone numbers) for addressing.

More recently, wireless networks have been developed. While the term wireless network may technically be used to refer to any type of network that is wireless, the term is often commonly used to refer to a telecommunications network whose interconnections between nodes is implemented without the use of wires, such as a computer network (which is a type of communications network). Wireless telecommunications networks can, for example, be implemented with some type of remote information transmission system that uses electromagnetic waves, such as radio waves, for the carrier and this implementation usually takes place at the physical level or "layer" of the network (e.g., the Physical Layer of the OSI Model). One type of wireless network is a WLAN or Wireless Local Area Network. Similar to other wireless devices, it uses radio instead of wires to transmit data back and forth between computers on the same network. Wi-Fi is a commonly used wireless network in computer systems which enable connection to the internet or other machines that have Wi-Fi functionalities. Wi-Fi networks broadcast radio waves that can be picked up by Wi-Fi receivers that are attached to different computers or mobile phones. Fixed wireless data is a type of wireless data network that can be used to connect two or more buildings together in order to extend or share the network bandwidth without physically wiring the buildings together. Wireless MAN is another type of wireless network that connects several Wireless LANs.

Today, several mobile networks are in use. One example is the Global System for Mobile Communications (GSM) which is divided into three major systems which are the switching system, the base station system, and the operation and support system (Global System for Mobile Communication (GSM)). A cell phone can connect to the base system station which then connects to the operation and support station; it can then connect to the switching station where the call is transferred where it needs to go (Global System for Mobile Communication (GSM)). This is used for cellular phones and common standard for a majority of cellular providers. Personal Communications Service (PCS): PCS is a radio band that can be used by mobile phones in North America. Sprint happened to be the first service to set up a PCS. Digital Advanced Mobile Phone Service (D-AMPS) is an upgraded version of AMPS but it may be phased out as the newer GSM networks are replacing the older system.

Yet another example is the General Packet Radio Service (GPRS) which is a Mobile Data Service available to users of Global System for Mobile Communications (GSM) and IS-136 mobile phones. GPRS data transfer is typically charged per kilobyte of transferred data, while data communication via traditional circuit switching is billed per minute of connection time, independent of whether the user has actually transferred data or has been in an idle state. GPRS can be used for services such as Wireless Application Protocol (WAP) access, Short Message Service (SMS), Multimedia Messaging Service (MMS), and for Internet communication services such as email and World Wide Web access. 2G cellular systems combined with GPRS is often described as "2.5G", that is, a technology between the second (2G) and third (3G) generations of mobile telephony. It provides moderate speed data transfer, by using unused Time Division Multiple Access (TDMA) channels in, for example, the GSM system. Originally there was some thought to extend GPRS to cover other standards, but instead those networks are being converted to use the GSM standard, so that GSM is the only kind of network where GPRS is in use. GPRS is integrated into GSM Release 97 and newer releases. It was originally standardized by European Telecommunications Standards Institute (ETSI), but now by the 3rd Generation Partnership Project (3GPP). W-CDMA (Wideband Code Division Multiple Access) is a type of 3G cellular network. W-CDMA is the higher speed transmission protocol used in the Japanese FOMA system and in the UMTS system, a third generation follow-on to the 2G GSM networks deployed worldwide. More technically, W-CDMA is a wideband spread-spectrum mobile air interface that utilizes the direct sequence Code Division Multiple Access signaling method (or CDMA) to achieve higher speeds and support more users compared to the implementation of time division multiplexing (TDMA) used by 2G GSM networks. It should be noted that SMS can be supported by GSM and MMS can be supported by 2.5G/3G networks.

Generally, a mobile phone or cell phone can be a long-range, portable electronic device used for mobile communication. In addition to the standard voice function of a telephone, current mobile phones can support many additional services such as SMS for text messaging, email, packet switching for access to the Internet, and MMS for sending and receiving photos and video. Most current mobile phones connect to a cellular network of base stations (cell sites), which is in turn interconnected to the public switched telephone network (PSTN) (one exception is satellite phones).

The Short Message Service (SMS), often called text messaging, is a means of sending short messages to and from mobile phones. SMS was originally defined as part of the GSM series of standards in 1985 as a means of sending messages of up to 160 characters, to and from Global System for Mobile communications (GSM) mobile handsets. Since then, support for the service has expanded to include alternative mobile standards such as ANSI CDMA networks and Digital AMPS, satellite and landline networks. Most SMS messages are mobile-to-mobile text messages, though the standard supports other types of broadcast messaging as well. The term SMS is frequently used in a non-technical sense to refer to the text messages themselves, particularly in non-English-speaking European countries where the GSM system is well-established.

Multimedia Messaging Service (MMS) is a relatively more modern standard for telephony messaging systems that allows sending messages that include multimedia objects (images, audio, video, rich text) and not just text as in Short Message Service (SMS). It can be deployed in cellular networks along with other messaging systems like SMS, Mobile Instant Messaging and Mobile E-mal. Its main standardization effort is done by 3GPP, 3GPP2 and Ope Mobile Alliance (OMA).

The popularity of computing systems, especially mobile communication devices, is evidenced by their ever increasing use in everyday life. Accordingly, techniques for improving their efficiency and/or safety would be useful.

SUMMARY OF THE INVENTION

Broadly speaking, the invention relates to computing environments and/or computing systems. More particularly, the invention pertains to techniques for representation and verification of data in and/or for computing environments and/or computing systems. The techniques of the invention, among other things, can be used to represent and verify the integrity of data (integrity verification) in safe computing environments and/or systems (e.g., Trusted Computing (TC) systems and/or environments). As such, the invention is especially useful for safe computing environments and/or systems given their reliance on integrity verification as a mechanism for ensuring their safety.

In accordance with one aspect of the invention, multiple representative values can be independently determined respectively for multiple portions (segment or partitions) of data as multiple independent representative values. In other words, a first representative value for a first portion of the data can be determined independently from the content of a second portion of the data and independently from the determination of a second representative value for a second portion of the data. It should be noted that no assumptions need to be made regarding the effective division (or partition) of the data or its content. As such, the data portions can, for example, be distinct, or effectively overlap each other, or effectively repeat content, and so on. Data can, for example, be in a binary form and include various forms and/or types of content (e.g., executable code, boot code, a file system, one or more files, multimedia content, textual content).

It will be appreciated that multiple independent representative values can be used for verification of the integrity of the data in accordance with a related aspect of the invention. In accordance with one embodiment of the invention, a representative value of a particular data portion can, for example, be determined as a one-way mapping value (e.g., a hash value) of that data portion. The one-way mapping value can, for example, be determined as a value that is not intended to map back to its respective data portion (e.g., a hash value), as will be appreciated by those skilled in the art. In any case, multiple one-way mapping values can be independently determined respectively for multiple portions of the data and effectively used to verify the integrity of the data. By way of example, two or more independent one-way mapping values of the data can be processed (e.g., concatenated, mapped to one or more other values) in order to determine a single value that can serve as a single integrity for verification of the integrity of the data. As another example, multiple independent one-way mapping values can serve a multiple integrity values for the data and can be effectively used to verify the integrity of the data.

Moreover, it will be appreciated that multiple independent one-way mapping values can be determined effectively at the same time, in parallel and/or simultaneously in accordance with another aspect of the invention. In other words, two or more one-way mapping values can be determined respectively for two or more portions of the data effectively at the same time as two or more independent representative values. It will be appreciated that multiple representative values that are determined independently of each other and effectively at the same time can be used for verification of the integrity of the data in accordance with a related aspect of the invention. As noted above, a one-way mapping value of a data portion can, for example, be a value not intended to map back to the data portion (e.g., a hash value). In accordance with one embodiment of the invention, multiple processing streams can be processed effectively at the same time in order to independently determine multiple hash values for multiple portions of the data at the same time. Each processing stream can include a portion of the data and can be processed in accordance with a hashing technique (e.g., a SHA algorithm) as will be known to those skilled in the art. The parallel processing of the multiple processing streams can yield multiple independent hash values corresponding to multiple distinct portions of the data in less time than would be required to determine a single hash value for the data by sequentially processing the data as a whole. Those skilled in the art will appreciate that various processors and processing techniques can be used to process multiple processing streams effectively at the same time, in parallel and/or simultaneously. In fact, the general trend in multi-core processing and general availability of Multi-core processors render the invention especially practical and useful for both existing and future processing or computing platforms.

In accordance with yet another aspect of the invention, a single one-way mapping instruction (e.g., a hashing instruction) can effectively operate on multiple data portions of data arranged in multiple streams in order to determined multiple independent one-way mapping for the data effectively at the same time, in parallel, and/or simultaneously. In accordance with one embodiment of the invention, a Single Instruction Multiple Data (SIMD) architecture (or SIMD complaint and/or similar architecture) can be used for processing multiple processing streams associated with multiple independent one-way mapping values (e.g., hash values). In particular, it will be appreciated that hashing operations are well suited for processing using a Single Instruction Multiple Data (SIMD) approach in light of the nature of hashing techniques where the same instruction may be applied to data time and time again.

The invention can be implemented in numerous ways, including, for example, a method, an apparatus, a computer readable (and/or storable) medium, and a computing system (e.g., a computing device). A computer readable medium can, for example, include at least executable computer program code stored in a tangible form. Several embodiments of the invention are discussed below.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 1B depicts a plurality of data portions (D1 and D2) of data in accordance with one embodiment of the invention.

FIG. 1C depicts various exemplarily data portions that can be processed independently and possibly in parallel in accordance with embodiments of the invention.

DETAILED DESCRIPTION OF THE INVENTION

Figure 1A:
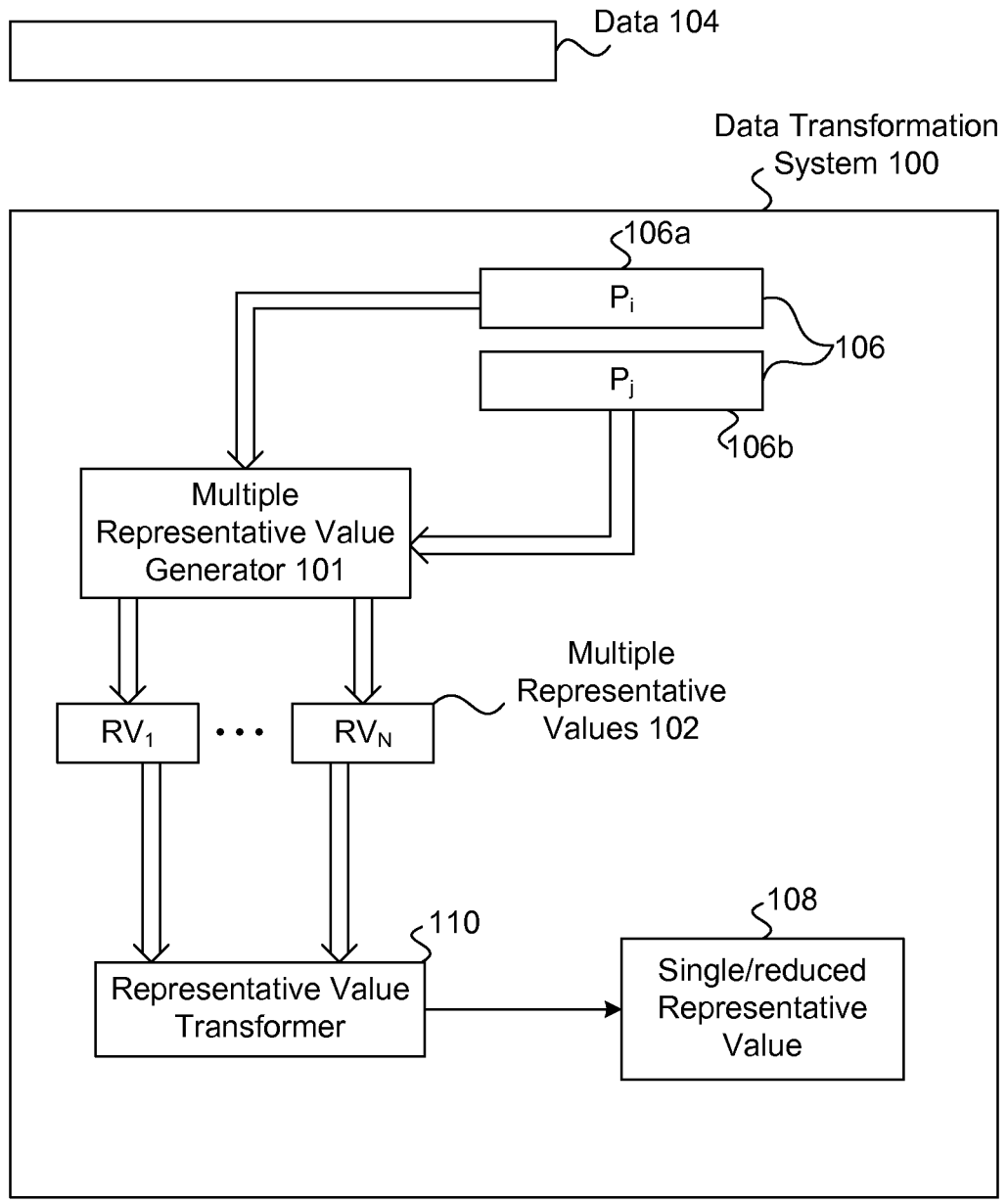
FIG. 1A depicts a data transformation system in accordance with one embodiment of the invention.

As noted in the background section, mobile devices are becoming increasingly more popular. Today, wireless networks and mobile communication devices (e.g., Smartphones, cell phones, Personal Digital Assistants) are especially popular. Unfortunately, however, partly because of this popularity, more and more malicious attacks are being directed to wireless networks and mobile communication devices. In addition, recent developments, including relatively new services (e.g., email, file transfer and messaging), and use of common software platforms (e.g., Symbian, Embedded Linux, and Windows CE operating systems) has made mobile communication devices relatively more exposed to malicious attacks. The exposure to malicious attacks could worsen as the wireless networks and mobile communication devices continue to evolve rapidly. Today, wireless and/or portable communication devices (e.g., cell phones, Smartphones) can offer similar functionality as that more traditionally offered by Personal Computers (PCs). As a result, wireless and/or portable communication devices are likely to face similar security problems (e.g., worms, viruses) as those encountered in more traditional computing environments.

Examples of the most notorious threats to cell phones include the Skull, Cabir, and Mabir worms which have targeted the Symbian operating systems. Generally, an MMS-based worm can start attacking initial targets (hit-list) from the network. Each infected phone can scan its contact list and randomly pick up members to deliver a malicious attack in the form of a message. A person can trust an incoming message due to its attractive title or seemingly familiar source and activate the attached file and unwittingly get a phone infected. The infected phone can in turn get other phones infected, and so on. In contrast, a Blue-tooth based worm can take control of a victim phone's Blue-tooth interface and continuously scan for other Blue-tooth-enabled phones within its range. Once a new target has been detected, the worm can effectively connect to other devices and transfers a malicious message to them, and so on.

Taking the cell phone as an example, an active cell phone typically has two security states: susceptible and infected. A susceptible cell phone is not completely protected against worms and may get infected when exposed to a specific worm (e.g., CommWarrior). An infected cell phone can return back to the susceptible state when the user launches a protection (e.g., the CommWarrior patch from F-Secure or Symantec) partly because the cell phone is susceptible to other worm threats. Malware has many other undesirable affects including compromising the privacy of the users.

Today, security of the computing systems (or devices) is a major concern. Generally, it is important that various components of a computing environment and/or computing system maintain their integrity. As such, integrity of a computing component is crucial to ensuring the security (or safety) of a computing system (e.g., a "trusted" device). A secure system (or device) can, for example, be provided as a trusted system (or device) in accordance with the Trusted Computing (TC) principles primarily developed and promoted by the Trusted Computing Group. In Trusted Computing (TC), verification of integrity can be done by taking "Integrity Measurements" of the content. Integrity of various software components, including operating systems and application programs, can be measured (or taken), for example, by using a cryptographic hash function (or hash function). A hash function can generate as output a value (or hash value) for content (e.g., binary code, text files). The hash values can, for example, be represented as a binary or integer value (e.g., "01010000", "1390") or as a string "coffee." A hash value can be the input to algorithms for cryptography such as RSA, as known in the art. Hash values can be securely stored as trusted integrity values (or values that are trusted or believed to be safe). The trusted integrity values can be compared to Integrity values subsequently obtained to ensure the integrity of a computing environment and/or computing system. As such, a trusted integrity value can effectively serve as a point of reference where a deviation would indicate that the integrity has been compromised.

Integrity Measurements (IM) are crucial for providing a Trusted Computing (TC) environment. More generally, providing a safe computing environment typically requires verifying the integrity of various components operating in the computing environment. As such, integrity measurements and integrity verification techniques are highly useful.

However, conventional integrity verification techniques can be costly and/or difficult to implement for some systems. By way of example, in a conventional safe computing environment and/or system (e.g., a conventional Trusted Computing (TC) environment and/or system), the integrity of data is verified by taking an integrity measurement of the data by sequentially processing the data as a whole. Typically, a hash value (or digest value) is determined for the data. More particularly, the data is read piece by piece and hashed in a sequential manner to determine a hash value for the data. In other words, the hash value is effectively updated as each piece (portion or segment) of the data hashed is hashed sequentially (or in sequence) in order to determine a final value (or final hash value) for the data. As generally known in the art, a hash function can, for example, be used as any procedure or mathematical function for turning some kind of data into a relatively small integer. The values returned by a hash function can be called hash values, hash codes, hash sums, or simply hashes.

In any case, the hash value (or final hash value) of data can represent an integrity value (or integrity measurement) of the data. As such, the hash value can be compared with an expected hash value (or expected integrity value) of the data representing a value this is known and/or believed to be safe and as such trusted in order to determine whether the data has maintained its integrity.

Given the large number of relatively large components (e.g., operating systems, file systems, and files) that can exist in a modern computing environment even in a compressed form, the current trend of using larger data sizes including multimedia, and the general desire to further improve the safety of the computing environments by verifying more components and verifying them more often than not, it will be apparent that the conventional technique for hashing and thus verification of the integrity may not be efficient and/or feasible.

Therefore, alternative techniques for hashing and integrity verification of data would be useful. However, because of the sequential nature of hashing techniques, conventional wisdom suggests that improving the processing time for hashing data for integrity measurement would be difficult and thus improving the efficiency of the integrity verification would be unobtainable. However, contrary to the conventional wisdom, it will be appreciated that alternative data representation techniques of the invention, among other things, can be used to effectively verify data in less time than would be required by conventional techniques and thus enhance the integrity verification techniques that serve as a corner stone of safe computing environments and systems.

Broadly speaking, the invention relates to computing environments and/or computing systems. More particularly, the invention pertains to techniques for representation and verification of data in and/or for computing environments and/or computing systems. The techniques of the invention, among other things, can be used to represent and verify the integrity of data (integrity verification) in safe computing environments and/or systems (e.g., Trusted Computing (TC) systems and/or environments). As such, the invention is especially useful for safe computing environments and/or systems given their reliance on integrity verification as a mechanism for ensuring their safety.

In accordance with one aspect of the invention, multiple representative values can be independently determined respectively for multiple portions (segment or partitions) of data as multiple independent representative values. In other words, a first representative value for a first portion of the data can be determined independently from the content of a second portion of the data and independently from the determination of a second representative value for a second portion of the data. It should be noted that no assumptions need to be made regarding the effective division (or partition) of the data or its content. As such, the data portions can, for example, be distinct, or effectively overlap each other, or effectively repeat content, and so on. Data can, for example, be in a binary form and include various forms and/or types of content (e.g., executable code, boot code, a file system, one or more files, multimedia content, textual content).

It will be appreciated that multiple independent representative values can be used for verification of the integrity of the data in accordance with a related aspect of the invention. In accordance with one embodiment of the invention, a representative value of a particular data portion can, for example, be determined as a one-way mapping value (e.g., a hash value) of that data portion. The one-way mapping value can, for example, be determined as a value that is not intended to map back to its respective data portion (e.g., a hash value), as will be appreciated by those skilled in the art. In any case, multiple one-way mapping values can be independently determined respectively for multiple portions of the data and effectively used to verify the integrity of the data. By way of example, two or more independent one-way mapping values of the data can be processed (e.g., concatenated, mapped to one or more other values) in order to determine a single value that can serve as a single integrity for verification of the integrity of the data. As another example, multiple independent one-way mapping values can serve a multiple integrity values for the data and can be effectively used to verify the integrity of the data.

Moreover, it will be appreciated that multiple independent one-way mapping values can be determined effectively at the same time, in parallel and/or simultaneously in accordance with another aspect of the invention. In other words, two or more one-way mapping values can be determined respectively for two or more portions of the data effectively at the same time as two or more independent representative values. It will be appreciated that multiple representative values that are determined independently of each other and effectively at the same time can be used for verification of the integrity of the data in accordance with a related aspect of the invention. As noted above, a one-way mapping value of a data portion can, for example, be a value not intended to map back to the data portion (e.g., a hash value). In accordance with one embodiment of the invention, multiple processing streams can be processed effectively at the same time in order to independently determine multiple hash values for multiple portions of the data at the same time. Each processing stream can include a portion of the data and can be processed in accordance with a hashing technique (e.g., a SHA algorithm) as will be known to those skilled in the art. The parallel processing of the multiple processing streams can yield multiple independent hash values corresponding to multiple distinct portions of the data in less time than would be required to determine a single hash value for the data by sequentially processing the data as a whole. Those skilled in the art will appreciate that various processors and processing techniques can be used to process multiple processing streams effectively at the same time, in parallel and/or simultaneously. In fact, the general trend in multi-core processing and general availability of Multi-core processors render the invention especially practical and useful for both existing and future processing or computing platforms.

In accordance with yet another aspect of the invention, a single one-way mapping instruction (e.g., a hashing instruction) can effectively operate on multiple data portions of data arranged in multiple streams in order to determined multiple independent one-way mapping for the data effectively at the same time, in parallel, and/or simultaneously. In accordance with one embodiment of the invention, a Single Instruction Multiple Data (SIMD) architecture (or SIMD complaint and/or similar architecture) can be used for processing multiple processing streams associated with multiple independent one-way mapping values (e.g., hash values). In particular, it will be appreciated that hashing operations are well suited for processing using a Single Instruction Multiple Data (SIMD) approach in light of the nature of hashing techniques where the same instruction may be applied to data time and time again.

Embodiments of these aspects of the invention are discussed below with reference to FIGS. 1A-6. However, those skilled in the art will readily appreciate that the detailed description given herein with respect to these figures is for explanatory purposes as the invention extends beyond these limited embodiments.

FIG. 1A depicts a data transformation system 100 in accordance with one embodiment of the invention. It will be appreciated that the data transformation system 100 can, for example, be effectively provided for and/or by various computing environments and/or computing systems (e.g., a computing device such as a Personal Computer, a mobile device such as a cell phone).

Referring to FIG. 1A, the data transformation system 100 including a multiple representative value generator 101 operable to generate (or capable of generating) multiple representative values 102 based on the data 104. It should be noted that each of the multiple representative values 102 can be determined for a data portion (e.g., $P_i$ and $P_j$) of the data 104 as a one-way mapping value (e.g., a hash value) for the data. The one-way mapping value of a particular data portion $P_i$ can, for example, be a value not intended to map back to the data portion. As such, a one-way mapping value for a relatively long series of binary values (e.g., a file) can, for example, map to an integer value (e.g., "1034"). By way of example, a representative value ($RV_i$) can be determined as a one-way mapping value for a data portion $P_i$ of the data 104, and a representative value ($RV_j$) can be determined as a one-way mapping value for a data portion $P_j$, and so on. Moreover, the one-way mapping value (or representative values) $RV_i$ and $RV_j$ can be determined independently of each other. In other words, a first one-way mapping value can be determined as a representative value RV1 for a first data portion P1, a second one-way mapping value can be determined as a representative value RV2 for a second data portion P2, and so on.

As noted above, the multiple representative value generator 101 can determine the representative values 102 as values that are independent of each other. In other words, the one-way mapping value of a data portion $P_i$ can be determined independently from the content in another data portion $D_j$ and independently from the determination of the one-way mapping value of the data portion $D_j$. By way of example, first and second representative values can be determined independently by processing their respective data portions in two separate processing streams.

Furthermore, it will be appreciated that multiple processing streams can be processed effectively at the same time, thereby reducing the time required to determine multiple independent one-way mapping values as the representative values 102 based on the data 104. It will be appreciated that representing the data 104 in multiple streams and processing them at the same time could take less time than the time required to process the data 104 in one stream as a whole, as would be done by conventional techniques where a representative value (e.g., a hash value) is determined by processing the data 104 as a single processing stream in order to determine a single (or final) hash value for the data 104.

Those skilled in the art will readily appreciate that multiple processing streams (represented as 106a and 106b in FIG. 1A) can, for example, be processed by multiple processors, a multi-core processor, and/or executed as Single Instruction Multiple Data (SIMD) operation using a SIMD compatible processor. Typically, a data portion 106 (is further subdivided into two or more data portions (sub-portions, segment, or partitions) and processed sequentially. By way of example, the first data portion $P_i$ 106a can be subdivided into a plurality of sub-portions and processed sequentially in order to determine a first hash value as the representative value RV1 in a similar manner as conventional hashing techniques that will be known to those skilled in the art.

It should be noted that one or more of the multiple representative values 102 can be effectively used to represent the data 104 in its entirety or at least in part. However, it is also possible to further process the representative values 102 in order to determine a single and/or reduced representative value 108. Referring to FIG. 1A, the representative value transformer 110 can effectively transform the multiple representative values 102 into a single and/or reduced representative value 108. In other words, the representative value transformer 110 can effectively determine a representative value 108 based on the one or more representative values 102. By way of example, the representative value transformer 110 can concatenate two or more representative values 102 and/or further process the concatenated value (e.g., determine a hash value for the concatenated value) in order to determine the single and/or reduced representative value 108.

Those skilled in the art will readily appreciate that the data transformation system 100 can be implemented using hardware and/or software components. In particular, the data transformation system 100 can include one or more processors and memory (not shown). The one or more processors can be operable, configured and/or adapted to perform the operations described above with respect to the data transformation system 100. The data transformation system 100 can be effectively provided for and/or by a computing system (e.g., a Personal Computer, a cell phone).

It will be appreciated that the data transformation system 100 (shown in FIG. 1A) can be used to determine representative values for a wide range of applications. One such application is determination of integrity values in order to ensure and verify the integrity of various computing devices and systems. Given the ever increasing importance of integrity verification and its use in most modern computing systems, integrity verification is discussed in greater detail below as an important exemplary application.

Generally, data 104 can be divided into discrete portions for efficiency. However, it should be noted that no assumptions need to be made regarding the data portions 106, or their content, or any effective division or partition of the data 104.

To further elaborate, FIG. 1B depicts a plurality of data portions 106 (D1 and D2) of data 104 in accordance with one embodiment of the invention. Referring to FIG. 1B, compressed data 104a can be divided into two discrete portions of equal size or unequal sizes. However, referring to data 104b, data may also be divided into non-discrete and overlapping portions that each may even include nearly the entire content of the data 104.

To elaborate even further, FIG. 1C depicts various exemplarily data portions that can be processed independently and possibly in parallel in accordance with embodiments of the invention. Referring to FIG. 1C, data 104 can be effectively divided or partitioned into a plurality of data portions, segments, or partitions (D1, ... ,DN) which can be of equal or varying sizes, discrete, or overlapping as noted above and shown in FIG. 1B. More particularly, two data portions 106a and 106b depicts arrangement of the data portions of data 104, each of which can represent an independent processing stream for determining a one-way mapping value. The one-way mapping value can be determined by processing each one of the data portions, one by one, and in sequence. By way of example, the two data portions 111 can respectively be processed by processing (D1, D3, ... ) and (D2, D4, ... ). It should be noted that no assumptions regarding the arrangements of the content for processing needs to be made. As such, to data portions 106a and 106b can, for example, take various forms such as the depicted in FIG. 1C as 115 and 117. Furthermore, a multiple number of independent processing streams can be determined and possibly processed in parallel at the same time. Referring to FIG. 1C, there (3) processing streams (119), four (4) processing streams (121), six (6) processing streams (123) and eight (8) processing streams (125) are depicted. However, it will be appreciated that virtually any number of processing streams can be determined and possibly processed in parallel depending on the capabilities of the processing system.

Figure 1D:
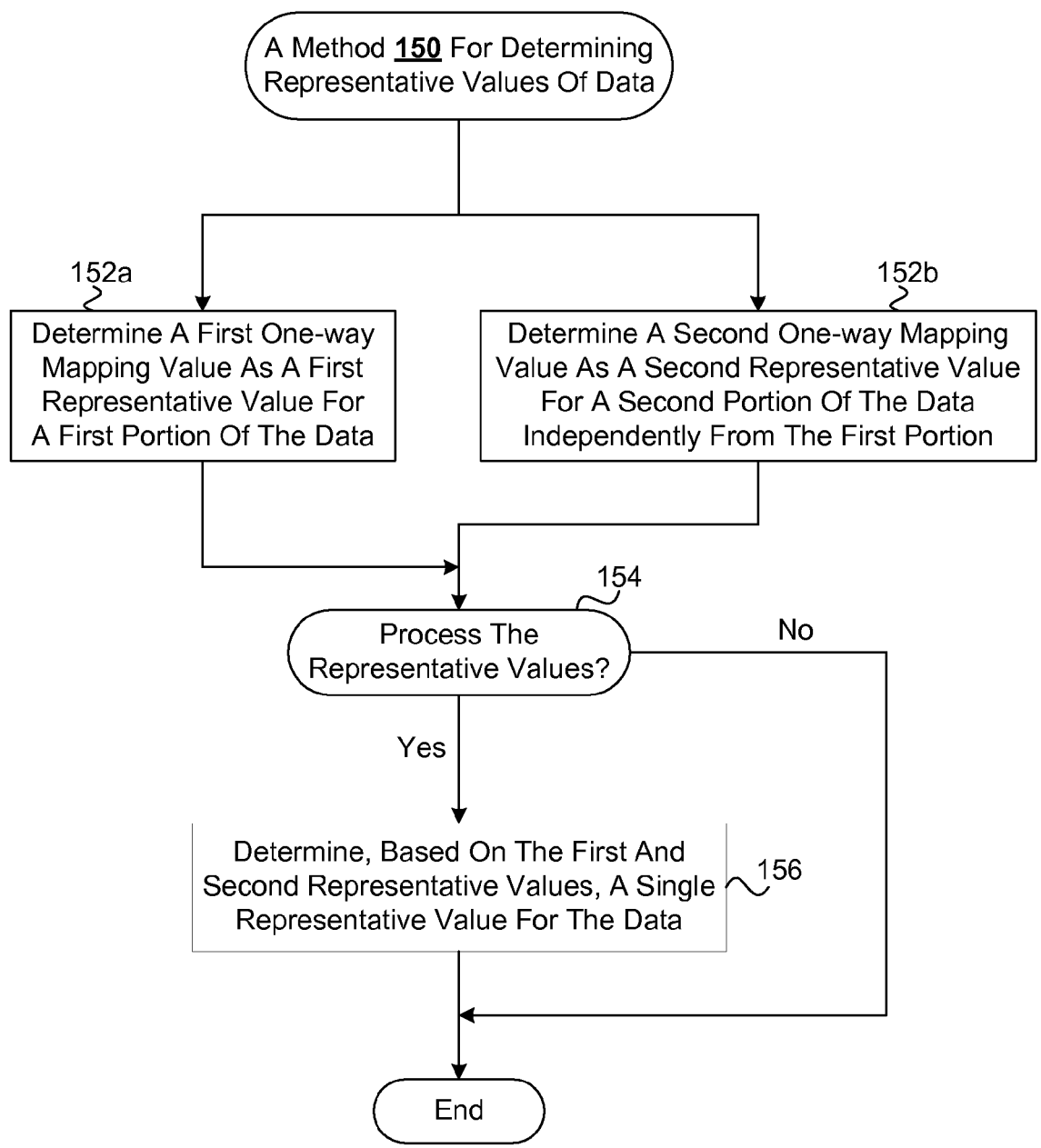
FIG. 1D depicts a method for determining representative values of data in accordance with one embodiment of the invention.

FIG. 1D depicts a method 150 for determining representative values of data in accordance with one embodiment of the invention. The method 150 can, for example, be used by the data transformation system 100 depicted in FIG. 1A. Referring to FIG. 1D, first and second representative values are respectively determined (152a and 152b). More particularly, the first and second representative values are respectively determined as one-way mapping values of the first and second portions of the data. It should be noted that the first and second one-way mappings values are determined independently of each other. As such, the first and second representative values are dependent of each other. The first and second portions of the data can be distinct from each other and the representative values can be representative of distinct portions of the data (e.g., separate halves or quarters of the data).

Referring back to FIG. 1D, it is determined (154) whether to process the representative values. If it is determined (154) not to process the representative values, then method 150 ends. As such, the first and second representative values can both be used to represent the data. By way of example, the first representative value can be used to represent the first portion of the data and the second representative value can be used to represent the second portion of the data. On the other hand, if it is determined (154) to process the representative values, a single representative value can be determined (156) based on the first and second representative values. By way of example, first and second representative values can be concatenated and/or mapped using a one-way mapping mechanism in order to determine a single representative value for the data.

It will readily be appreciated that the exemplary method 150 can be extended to determine 2, 3, 4, 5, and virtually any number of independent representative values that can optionally be the basis for determining one or more representative values of data. By way of example, four representative values can be independently determined as 152a, 152b, 152c and 152d (not shown in FIG. 1D) and further processed (154) to determine (156) two or more representative values.

As noted above, the data transformation system 100 (shown in FIG. 1A) can be used to determine representative values for a wide range of applications including the determination of integrity values in order to ensure and verify the integrity of various computing devices and systems.

Figure 2A:
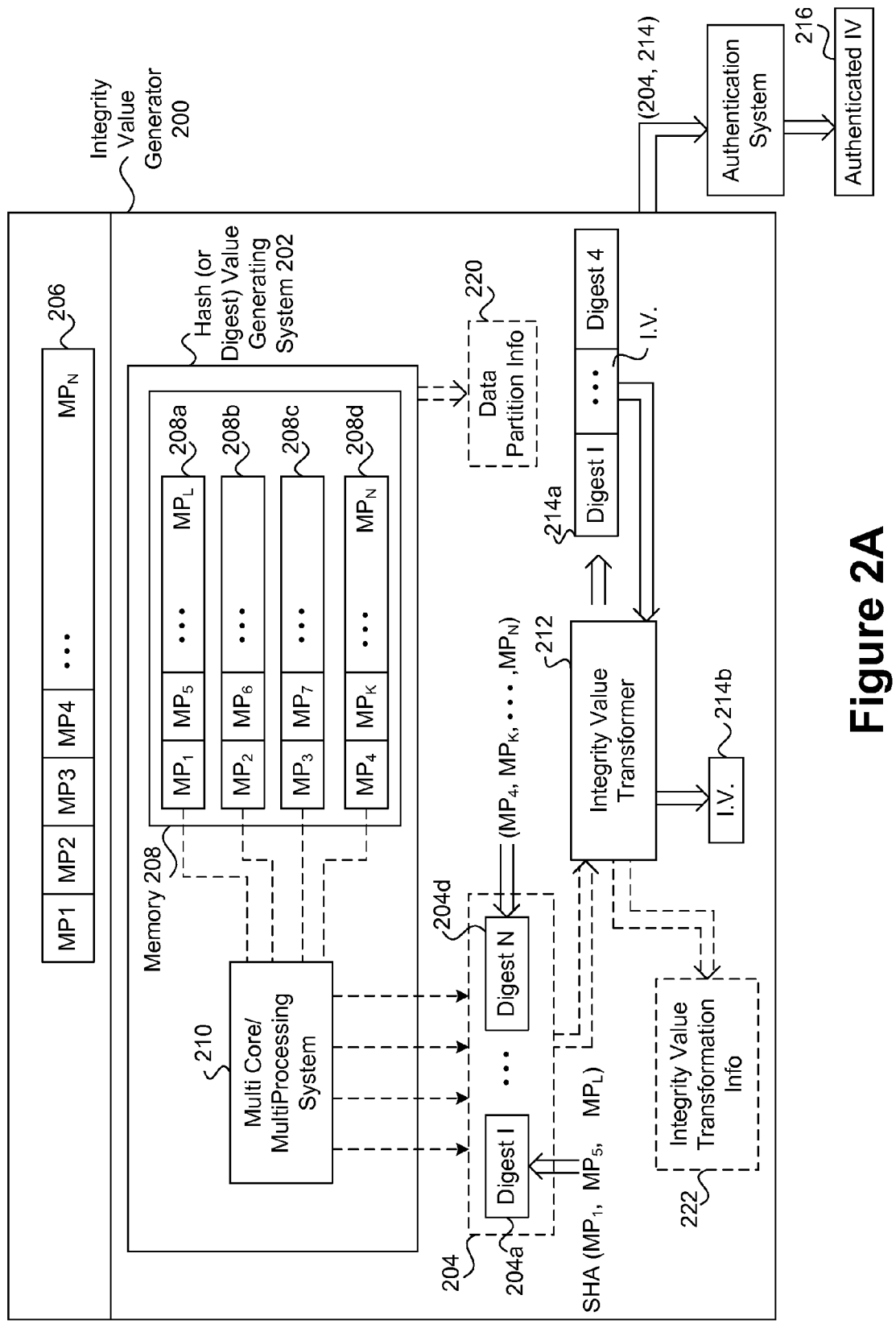
FIG. 2A depicts an integrity value generator in accordance with one embodiment of the invention.

To further elaborate, FIG. 2A depicts an integrity value generator 200 in accordance with one embodiment of the invention. Referring to FIG. 2A, a hash or digest (or message digest) value generating system 202 can generate multiple hash or digest values 204 for data 206. Each of the hash or digest values 204 are determined for a respective data portion 208 of the data 206 (or message portion). In other words, hash or digest value 204a is determined for the data portion 208a, the hash or digest value 204b is determined for the data portion 206b, and so on. Referring back to FIG. 2A, the hash or digest value generating system 202 includes a multi-core/multiprocessing system 210 capable of processing multiple processing streams at the same time. Those skilled in the art will readily appreciate that the multi-core/multiprocessing system 210 can, for example, include a Central Processing Unit (CPU) and a Graphical Processing Unit (GPU) which are respectively designated for processing one or more processing streams in order to determine one or more hash or digest values 204 of the data portion 208.

As another example, the multi-core/multiprocessing system 210 can include a generally known and widely available multi-core processing system (e.g., a dual-core processing system, quad-core processing system) for processing multiple streams 208 in parallel or effectively at the same time. As yet another example, a Single Instruction Multiple Data compatible processor (SIMD) can be used to process multiple streams 208 in parallel or effectively at the same time. Given that the same operation, namely, determination of the hash or digest value is to be performed for each of the processing streams 208, a Single Instruction Multiple Data (SIMD) computable processor allows performing the same instruction on multiple data effectively at the same time. As such, initially, the same hashing operation (or instructions including machine and/or assembly instructions) can be performed for or on multiple data portions MP1, MP2, MP3, and MP4. Next, the same instruction can be performed on the data portions MP5, MP6, MP7 and MPk, and so on. In general, the multi-core/multiprocessing system 210 can include one or more of the following: a Central Processing Unit (CPU), a Graphical Processing Unit (GPU), a specialized processor, a Single Instruction Multiple Data (SIMD) processor, a MMX (or iwMMXT) instruction compliant processor for embedded systems, a Multiple Instruction Multiple Data (MIMD) processor, a multi-core processor (e.g. a dual-core processor, a quad-core processor). However, regardless of the processor or processing technique that is used, the hash or digest value generating system 202 can effectively determine multiple hash values or digest values for multiple processing systems representing multiple data portions 208 independently and at the same time. A hash or digest value 204 can, for example, be determined using a SHA function, as will be known to those skilled in the art. Furthermore, a hash or digest values 204 can be directly used as integrity values for the data 206 or transformed into an integrity value, such as, for example, a reduced and/or single value. Referring to FIG. 2A, the integrity value transformer 212 can effectively transform the multiple hash values 204 in order to generate a reduced and/or single integrity value 214. By way of example, the integrity value transformer 212 can effectively concatenate the multiple digest values 204 to produce a concatenated integrity value 214a. The concatenated integrity value 214a can further be processed in order to generate a reduced and/or single integrity value 214b by determining its digest value. It should be noted that the hash value generating system 202 can optionally produce data partition information 220 to effectively indicate the partition of the data 206. The data partition information 220 can later be used in determining (or re-determining) how to divide the data 206 in order to determine (e.g., recalculate) the hash value used for integrity verification. Similarly, the integrity value transformer 212 can optionally produce integrity value transformation information 222 effectively indicating how a reduced and/or single integrity value 214 is generated. As such, the data-partition information and/or integrity value transformation information can be effectively used for integrity verification and during integrity verification process. It will be appreciated that the manner in which data is partitioned and/or integrity values are transformed could effectively provide an added level of security.

As noted above, the size of data portions (or message portions or partitions) can be fixed or varied. For example, each data portion can be divided in accordance with the input preferences or requirements of a specific hashing being used. A single processing stream (e.g., 208a) can be processed in sequence in a similar manner as conventional hashing techniques effectively partition and process an input message. For example, in SHA hashing algorithm, a message can be partitioned into fixed length partitions corresponding to the specific SHA Algorithm used. As such, 512 bit-size messages can be used for SHA-0, SHA-1, SHA-224 and SHA-256, 1024 bit-size messages can be used for SHA-384 and SHA-512, and so on. The size of the hash value or message digest can also be dependent on the specific SHA algorithm used. As such, the size of the hash value (or message digest 204) for each one of the processing streams 208 can, for example, be 160 bits for SHA-1, 256 bits for SHA-256, 384 bits for SHA-384, and so on. Those skilled in the art will readily know that the number of processing streams for determining multiple hash values 204 can depend on various factors including, for example, the word size used in a hash algorithms (e.g., 32 bits for SHA-1 and SHA-256, 64 bits for SHA-384 and SHA-512) and the multiprocessing algorithm (e.g., the SIMD architecture), the number of processing cores, and/or processors that are provided for a system, and so on. For example, if a SIMD architecture provides 64-bit registers, then two words can be stored in registers if SHA-1 hashing algorithm is used. As a result, two (2) hash values can be determined in parallel. However, if SIMD registers are 128 bit long, then four words can fit in the registers and as thus four hashing operations can be performed in parallel to effectively determine four (4) hash values (or message digests) independently and in parallel. It will be appreciated that the SIMD concept is especially useful for performing hashing operations partly because of the nature of the hashing process where the same operation can be performed on different data. By way of example, a SHA operation can be performed on data portions MP1, MP2, MP3 and MP4. Then another SHA operation can be performed on message portions MP5, MP6, MP7 and MP8, and so on. However, if 64 bit SIMD registers are provided, only two streams would be processed in parallel. By way of example, two processing streams (D1, D3, D5) (D2, D4, D6) can be processed. In this example, the first 32 bit values can hold data related for the operation of SHA (M1, M3 . . . ) and the other half would hold the value for SHA (M2, M4 . . . ). After the execution of the SHA instruction on the register, the result would be hash 1 (or digest 1) and hash 2 (or digest 2) for an input M, where Digest 1 equals SHA (M1, M3 . . . ), and digest 2 equals SHA (M2, M4, . . . ).

Figure 2B:
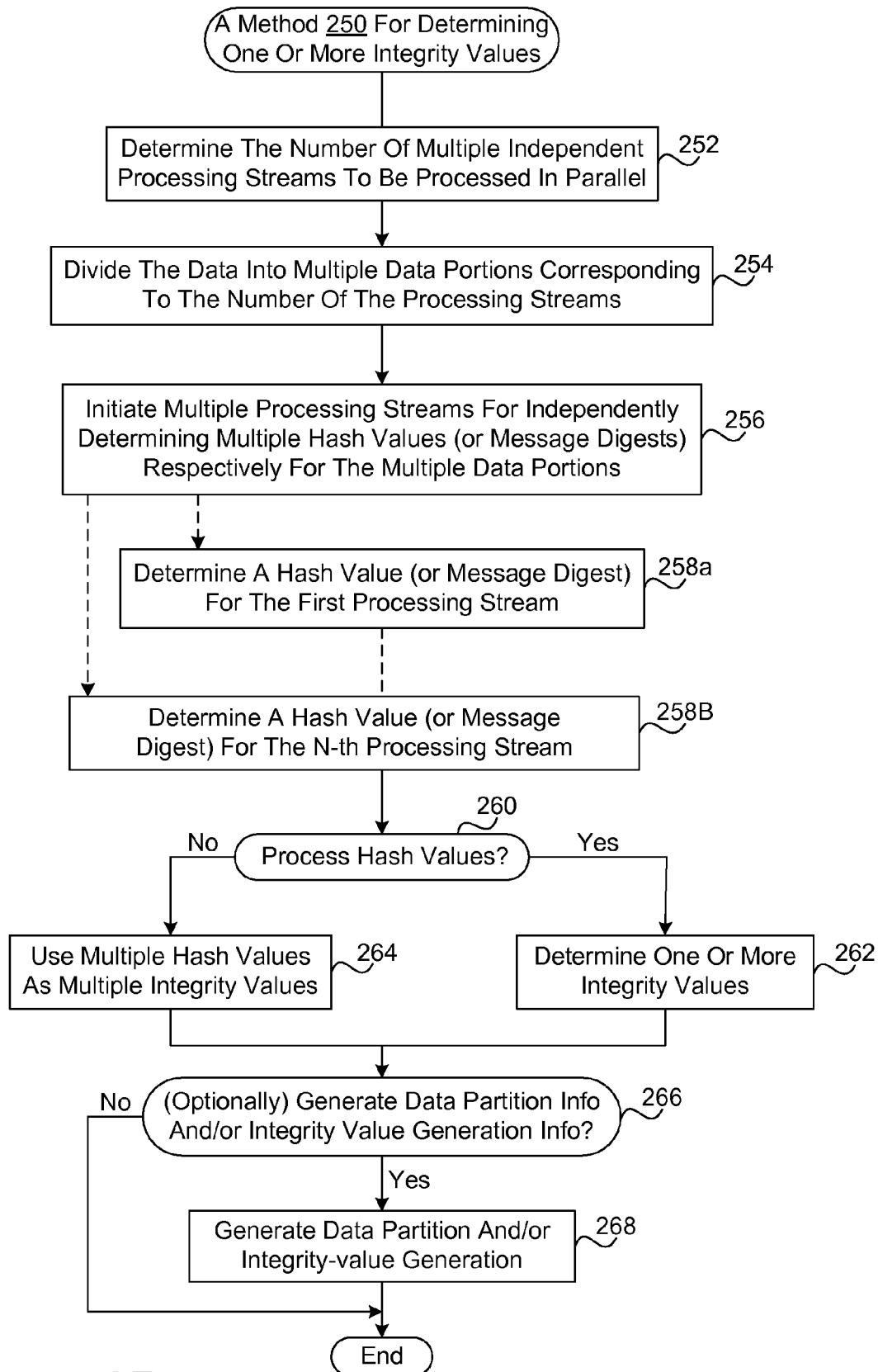
FIG. 2B depicts a method for determining one or more integrity values in accordance with one embodiment of the invention.

FIG. 2B depicts a method 250 for determining one or more integrity values in accordance with one embodiment of the invention. Integrity value can be determined for various types of data including, for example, executable code (e.g., operating system code, boot code), file system and files. The method 250 can, for example, be performed by the integrity value generator depicted in FIG. 2A. Referring to FIG. 2B, initially, the number of multiple independent processing streams to be processed in parallel is determined (252). Typically, it is desirable to determine the maximum number of processing streams that can be processed in parallel. As noted above, the maximum number of processing streams can depend on various factors including the specific hashing algorithm used, the size of the registers, and the processing type of capabilities of the system.

Referring back to FIG. 2B, depending on the number of processing streams to be processed in parallel, data is divided (254) into multiple processing streams that can each include multiple data portions corresponding to the number of processing streams to be processed in parallel. Next, multiple processing streams are initiated (256). More particularly, multiple processing streams for independently determining multiple hash values (or message digest) for each of the data portions are initiated. As a result, a hash value (or message digests) is determined (258) for each one of the processing streams (258a and 258b). It should be noted that the hash values can be determined in parallel by effectively processing multiple processing streams each arranged to include a portion of the data. Thereafter, it is determined (260) whether to process the hash values in order to obtain one or more integrity values. Accordingly, if it is determined (260) to process the hash values, one or more integrity values are determined (262) based on the multiple hash values. By way of example, the multiple hash values can be concatenated together and/or effectively hashed to a single hash value using a hashing technique. On the other hand, if it is determined (260) not to process the hash values, the hash values can be used as integrity values of the data. By way of example, each one of the multiple hash values can be effectively assigned to the respective data portion and used as its integrity value. Subsequently, it can be determined (266) whether to generate data partition information and/or integrity value generation information. Data partition information can effectively indicate how to partition the data in order to determine (e.g., recalculate) the hash values. The integrity value generation information can indicate how to determine one or more integrity values based on the multiple hash values. Those skilled in the art will readily appreciate that the determination (266) can represent the design and/or programming option. In any case, if it is determined (266) to generate the data-partition information and/or integrity-value generation information, data-partition information and/or integrity value generation information are generated (268) before the method 250 ends. It should be noted that the data-partition information and/or integrity-value generation information can be effectively stored, retrieved and used for determining the hash values for data in order to determine whether the data or at least a portion of the data has maintained its integrity or not.

Figure 3A:
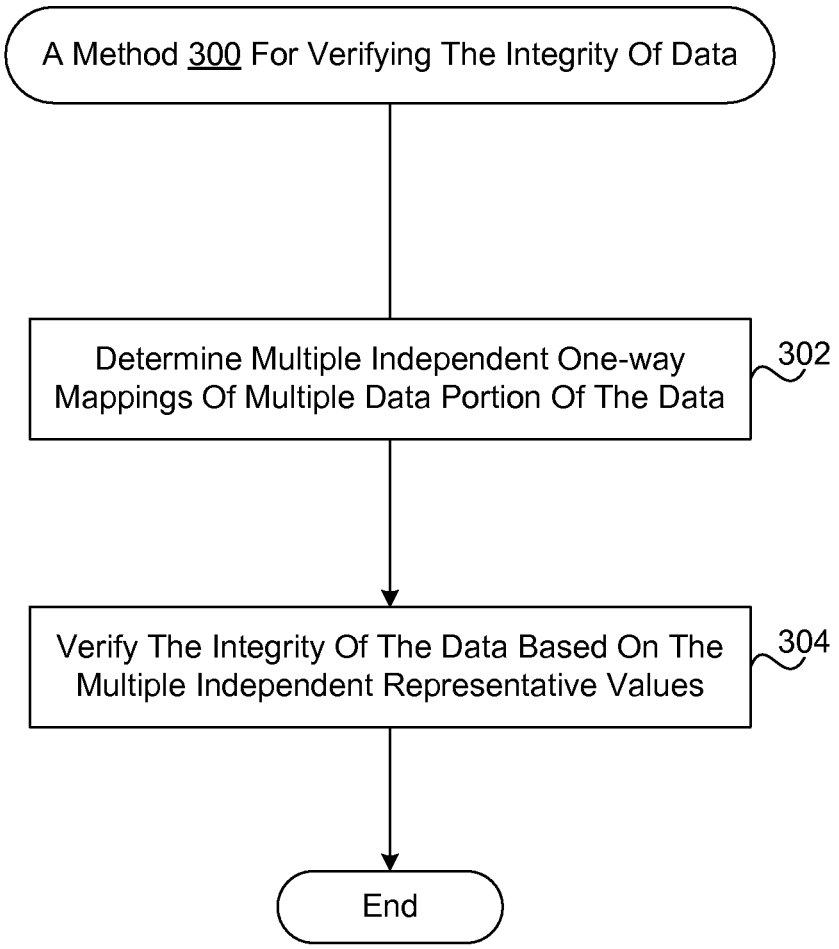
FIG. 3A depicts a method for verifying the integrity of data in accordance with one embodiment of the invention.

FIG. 3A depicts a method 300 for verifying the integrity of data in accordance with one embodiment of the invention. The method 300 can, for example, be performed by a safe computing system and/or in a safe computing environment. As such, the method 300 can, for example, be performed on a Trusted Computing Environment and/or Trusted Computing system, such as for example, a trusted personal computer or a trusted mobile phone). Referring to FIG. 3A, initially, multiple independent one-way mapping values are determined (302) based on the data as multiple independent representative values. It should be noted a one-way mapping value can be determined for a portion of the data (e.g., a distinct portion of the data). Typically, the one-way mapping value is not intended to map back to the data portion. As such, a hashing function (e.g., cryptographic hashing function) can, for example, be used to effectively determine a hash value for a data portion as a one-way mapping value that is not intended to map back to the data portion. Based on the multiple independent representative values, the integrity of the data can be verified (304) for the data before the method 300 ends.

Figure 3B:
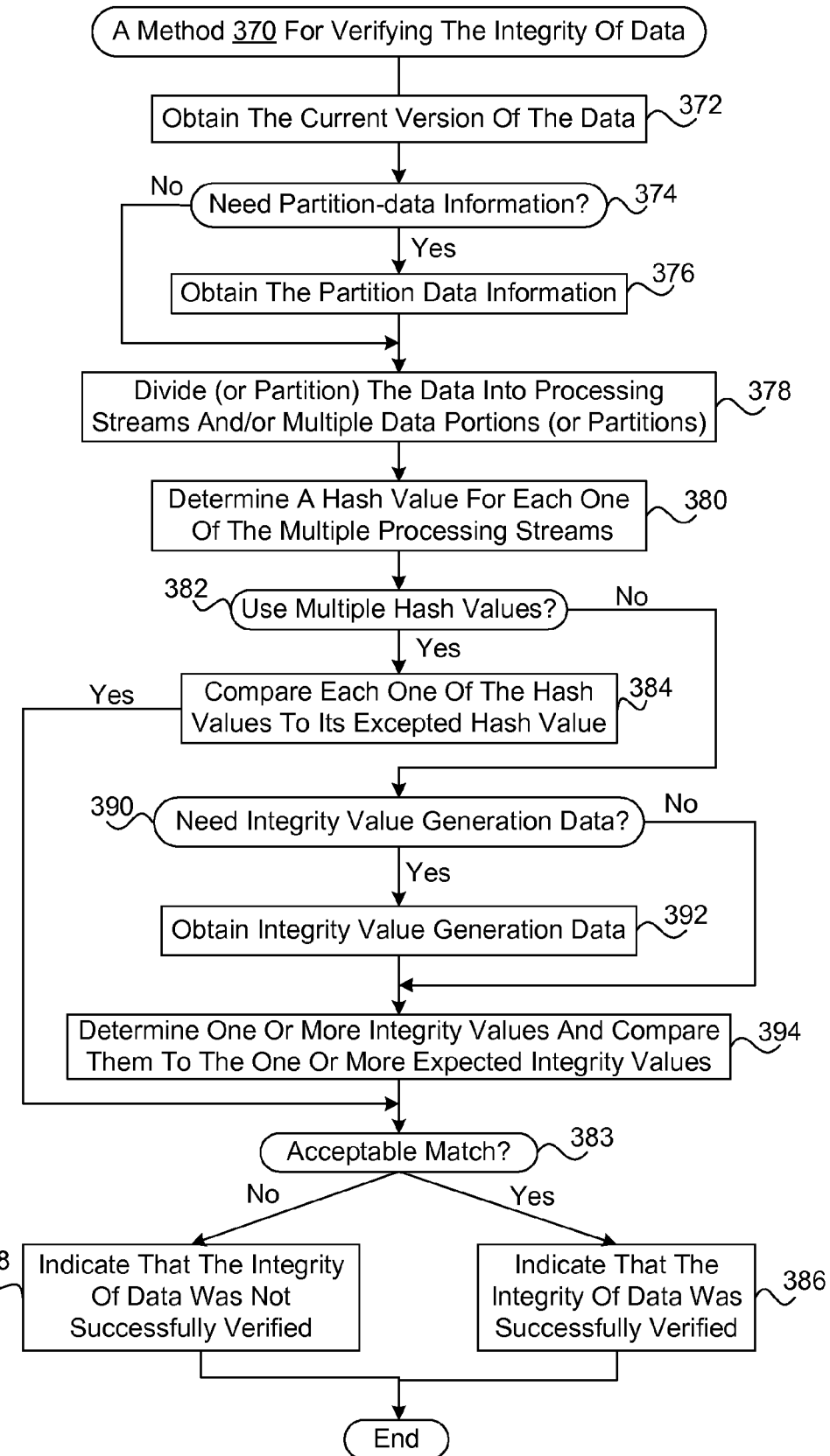
FIG. 3B depicts a method for verifying the integrity of data in accordance with one embodiment of the invention.

FIG. 3B depicts a method 370 for verifying the integrity of data in accordance with one embodiment of the invention. Referring to FIG. 3B, initially, the current version of the data is obtained (372). Next, it is determined (374) whether partition data information is needed. As a result, the partition-data information can be obtained (376). The partition-data information can effectively indicate how to divide the data into multiple streams, data portions (or partitions), and/or sub-portions within each of the streams (278). In lieu of the partition data information, the data can, for example, be divided in accordance with predetermined streams. After the division of the data into multiple processing streams, a hash value is determined (380) for each one of the multiple data portions independently. In other words, multiple independent hash values are determined (380). Again, it should be noted that multiple independent hash values can be determined in parallel. Next, it is determined (382) whether to use multiple hash values. If it is determined (382) to use multiple hash values, each of the hash values can be compared (384) to its expected hash value. Subsequently, it can be determined (383) whether the hash values are an acceptable match for the expected hash values. If it is determined (383) that the hash values are acceptable, it can be indicated (386) that the integrity of the data was successfully verified. However, if it is determined (386) that the hash values are not an acceptable match for the expected hash values, it can be indicated (388) that the integrity of the data was not successfully verified. On the other hand, if it is determined (382) not to use multiple hash values, it is determined whether integrity-value generation data is needed (390) and integrity-value generation data can be obtained (392) accordingly. Subsequently, one or more integrity values can be determined and compared (394) to one or more expected integrity values in order to determine (383) whether there is an acceptable match. If it is determined (383) that the one or more integrity values are an acceptable match for the one or more expected integrity values, it can be indicated (386) that the integrity of the data was successfully verified. However, if it is determined (383) that the one or more integrity values are not an acceptable match for the one or more expected values, it can be indicated (388) that the data integrity was not successfully verified. The method 370 ends after an indication of successful (386) or unsuccessful (388) verification of the integrity of the data.

It should be noted that determination (382) of whether or not to use multiple hash values can, for example, represent a design and/or programming choice. As such, this operation need not be performed. Similarly, determination (372) of whether to use partition-data information, or integrity value generation information can represent a design and/or programming choice. As such, this operation need not be performed. Those skilled in the art will known that determining a hash value for a single data portion can include subdividing the data portion and determining (or updating) the hash value sequentially using a conventional hashing techniques in order to determine a hash value (or final hash value) for the data portion.

Figure 4:
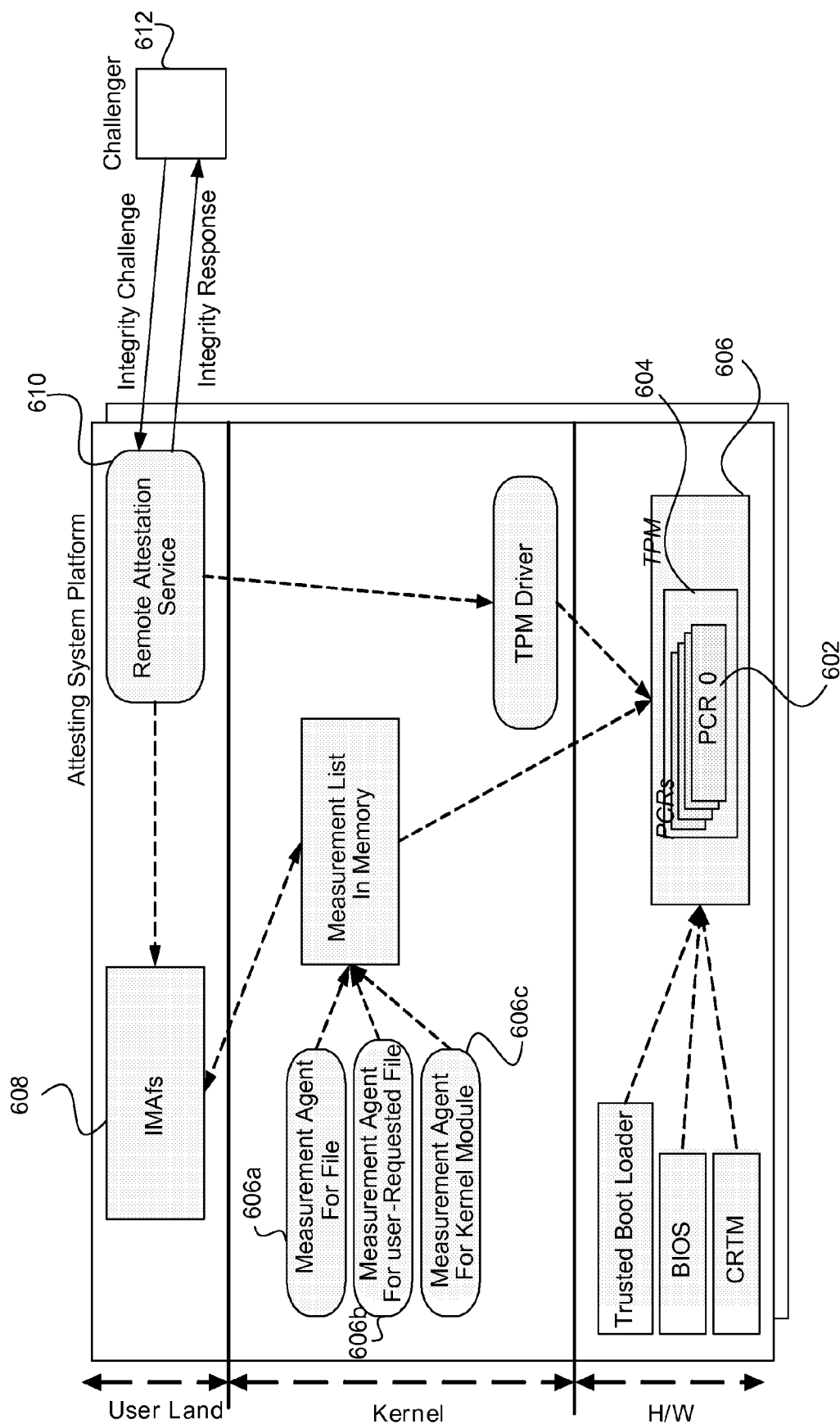
FIG. 4 depicts an exemplary computing system that can use multiple independent representative values of the data in order to verify the integrity of data in accordance with one embodiment of the invention.
Figure 6:
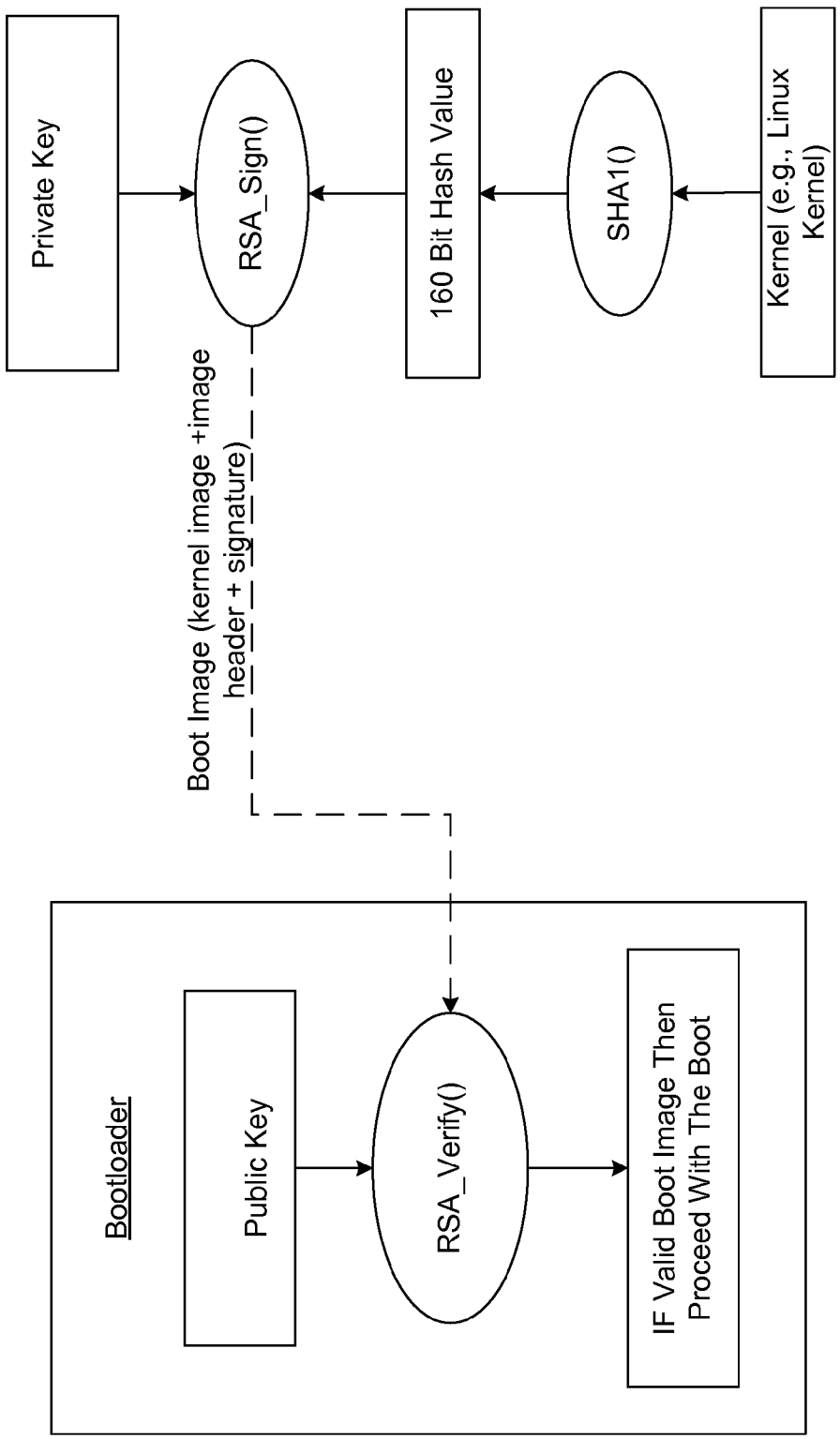
FIG. 6 depict an exemplary safe computing environment and integrity verification technique that can be used in accordance with one embodiment of the invention.

FIG. 4 depicts an exemplary computing system 600 that can use multiple independent representative values of the data in order to verify the integrity of data in accordance with one embodiment of the invention. Referring to FIG. 6, integrity values 602 can be securely stored by a Trusted Platform Module (TPM) 604 and used to effectively verify the integrity of various operating components including trusted a "boot-loader" and Basic Input Output System (BIOS). As will be known to those skilled in the art, various measurement agents 606 for files, user-requested files, and kernel modules can effectively operate in kernel space and communicate with Integrity Measurement Agents 608 for remote attestation services to respond to integrity challenges issued by a another system (challenger system) 612.

Figure 5:
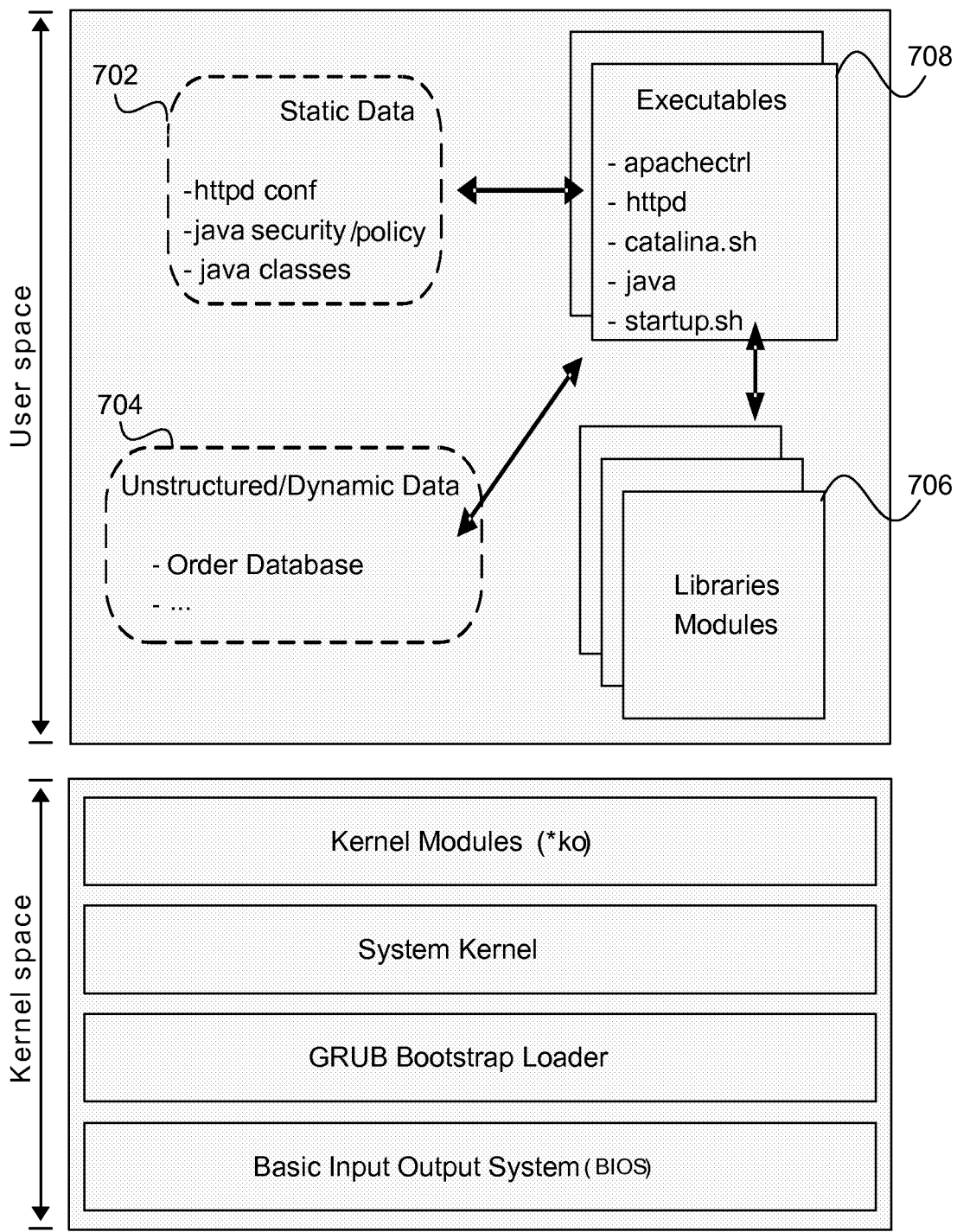
FIG. 5 depicts an exemplary computing environment including content that can be verified in accordance with one embodiment of the invention.

FIG. 5 depicts an exemplary computing environment 700 including content that can be verified in accordance with one embodiment of the invention. The computing environment 700 can, for example, represent a web server computing environment. Referring to FIG. 5, those skilled in the art will readily appreciate that various content including static data 702, unstructured/dynamic data 704 and library modules 706 and corresponding executables 708 can be effectively be verified in accordance with the techniques of the invention described above.

FIG. 6 depict an exemplary safe computing environment and integrity verification technique that can be used in accordance with one embodiment of the invention. More particularly, FIG. 6 depicts a specific exemplary process for hashing and digitally signing a boot image and verifying its integrity using specific exemplary hashing and signing techniques (SHA-1 and RSA) will be readily known and understood by those skilled in the art. Referring to FIG. 6, a kernel (e.g., a Linux kernel) can be hashed using a SHA-1 in accordance with the invention to generate a 160 bit hash value. In addition, a signature can be generated based on a private key using RSA encryption technique. Subsequently, a boot image including the kernel image and signature as well and an image header can be provided to a "Bootloader" for booting a computing system. The Bootloader can verify the signature using RSA verification technique. In addition, the Bootloader can verify the integrity of the kernel by verifying its hash value to be the 160 bit hash value in accordance with the techniques of the invention. The Bootloader can proceed with the boot only if it can successfully verify the signature and the integrity of the kernel to ensure that a trusted kernel is booted and provided as an operating system for the computing system.

As generally known in the art, a hash function can, for example, be any procedure or mathematical function for turning some kind of data into binary data that can, for example, be represented as a relatively small integer. The values returned by a hash function can be called hash values, hash codes, hash sums, or simply hashes.

A cryptographic hash function can, for example, be a transformation that takes an input (or message) and returns a fixed-size string, which can be called the hash value (message digest, a digital fingerprint, a digest or a checksum). Ideally, a cryptographic hash function should have three main properties: (i) being extremely easy to calculate for any given data (ii) being extremely difficult or almost impossible in a practical sense to calculate a text given the hash value, and (iii) it is extremely unlikely that two different messages, however close, will have the same hash.

Functions with these properties are used as hash functions for a variety of purposes, both within and outside cryptography. Practical applications include message integrity checks, digital signatures, authentication, and various information security applications.

In various standards and applications, the two commonly used hash functions are MD5 and SHA-1. Examples of hash algorithms of functions are listed below in the following table and may be selected in accordance with various criteria including the desired level of security.

published specification detailing a microcontroller that can store secured information, as well as the general name of implementations of that specification, often called "TPM chip" or "TPM Security Device." The TPM specification is the work of the Trusted Computing Group (TCG). The TPM published specifications are hereby incorporated by reference herein for all purposes.

Those skilled in the art will further appreciate that a Trusted Platform Module (TPM) can offers facilities for secure generation of cryptographic keys, the ability to limit the use of keys (to either signing/verification or encryption/decryption), as well as a Hardware Random Number Generator. It also includes capabilities such as remote attestation, binding and sealed storage. Remote attestation can create a summary of the hardware, boot, and host O/S configuration of a computer, allowing a third party to verify that the software and hardware has not been changed. Sealing encrypts data in such a way that it may be decrypted only in the exact same state (that is, it may be decrypted only on the computer it was encrypted running the same software). Binding encrypts data using the TPM's endorsement key (a unique RSA key put in the chip during its production) or another "trusted" key. A Trusted Platform Module can be used to authenticate a hardware device. Since each TPM chip is unique to a particular device, it is capable of performing platform authentication. For example, it can be used to verify that the system seeking the access is the expected system.

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computer-implemented method for integrity verification of data in a computing device based on representative values for said data, wherein said computer-implemented method comprises:

| Algorithm | Output size (bits) | Internal state size | Block size | Length size | Word size |
| --- | --- | --- | --- | --- | --- |
| HAVAL | 256/224/192/160/128 | 256 | 1024 | 64 | 32 |
| MD2 | 128 | 384 | 128 | No | 8 |
| MD4 | 128 | 128 | 512 | 64 | 32 |
| MD5 | 128 | 128 | 512 | 64 | 32 |
| PANAMA | 256 | 8736 | 256 | No | 32 |
| RadioGatun | Arbitrarily long | 58 words | 3 words | No | 1-64 |
| RIPEMD | 128 | 128 | 512 | 64 | 32 |
| RIPEMD-128/256 | 128/256 | 128/256 | 512 | 64 | 32 |
| RIPEMD-160/320 | 160/320 | 160/320 | 512 | 64 | 32 |
| SHA-0 | 160 | 160 | 512 | 64 | 32 |
| SHA-1 | 160 | 160 | 512 | 64 | 32 |
| SHA-256/224 | 256/224 | 256 | 512 | 64 | 32 |
| SHA-512/384 | 512/384 | 512 | 1024 | 128 | 64 |
| Tiger(2)-192/160/128 | 192/160/128 | 192 | 512 | 64 | 64 |
| WHIRLPOOL | 512 | 512 | 512 | 256 | 8 |

Trusted Computing (commonly abbreviated TC) is a technology developed and promoted by the Trusted Computing Group (TCG). In Trusted Computing, a "trusted" computer is trusted to behave in specific ways, and those behaviors are believed to be enforced by hardware and/or software. A Trusted Platform Module (TPM) can refer to the name of a determining a number of multiple independent processing streams;

dividing said data into said number of multiple independent processing streams for processing simultaneously and in parallel, wherein said multiple independent processing streams comprise a first data set including one or more data portions of said data in a first arrangement, and a second data set including one or more data portions of said data in a second arrangement, and wherein said first data set and said second data set are of equal or varying sizes, discrete or overlapping;

determining a first one-way mapping value for said first data set as a first representative value of said first data set, wherein said first one-way mapping value is not intended to map back to said first data set, and wherein said first one-way mapping value is based on each data portion of said first data set and said first arrangement; and determining a second one-way mapping value for said second data set as a second representative value of said second data set, wherein said second one-way mapping value is not intended to map back to said second data set, wherein said second one-way mapping value is based on each data portion of said second data set and said second arrangement, and wherein said second one-way mapping value is determined independently from said first one-way mapping value, thereby determining simultaneously and in parallel two independent one-way mapping values based on said data;

wherein data partition information indicating how to divide said data into said multiple independent processing streams is generated; and wherein said integrity verification of said data is based on said first representative value and said second representative value.

2. The computer-implemented method of claim 1, wherein:
said determining of said first one-way mapping value comprises determining a first hash value for said first data set; and
said determining of said second one-way mapping value comprises determining a second hash value for said second data set.

3. The computer-implemented method of claim 2, wherein said first and second hash values are first and second cryptographic hash values intended to be irreversible.

4. The computer-implemented method of claim 3, wherein said method further comprises:
determining, based on said first and second cryptographic hash values, a third value; and
digitally signing said third value to generate a digitally signed value for said data.

5. The computer-implemented method of claim 2, wherein said method further comprises:
determining, based on said first and/or second representative values, a third value; and
authenticating said third value to effectively generate an authenticated value of said data.

6. The computer-implemented method of claim 1, wherein said first and second data sets are one or more of the following:
two discrete data portions of said data;
two overlapping data portions of said data that overlap with respect to content of said data; and
two data portions of said data that repeat a portion of the content of said data.

7. The computer-implemented method of claim 1, wherein:
said determining of said second representative value and said determining of said first representative value are performed as two separate processing streams; and
said method further comprises:
determining, based on said first and second representative values, a third representative value to represent said data.

8. The computer-implemented method of claim 1, wherein said determining of said second representative value and said determining of said first representative value are performed at the same time.

9. The computer-implemented method of claim 1, wherein said determining of said second representative value and said determining of said first representative value are performed as two separate processing streams at the same time.

10. The computer-implemented method of claim 2, wherein said determining of said second representative value and said determining of said first representative value are performed at the same time as a Single Instruction Multiple Data (SIMD) operation.

11. The computer-implemented method of claim 2, wherein said determining of said second representative value and said determining of said first representative value are performed at the same time by a Multi Core processor.

12. The computer-implemented method of claim 1, wherein:
each data set is subdivided in two or more data sub-portions that are processed in sequence when determining a one-way mapping value for said data set.

13. The computer-implemented method of claim 1, wherein said method further comprises:
representing said data by using both of said first and second representative values;
wherein each data set comprises one of: one or more sequential data portions of said data, and one or more non-sequential data portions of said data.

14. The computer-implemented method of claim 1, wherein said first and second representative values respectively represent first and second integrity values or measurements for said first and second data sets.

15. The computer-implemented method of claim 1, wherein:
said data partition information is used for determining how to divide said data in order to recalculate said first and second representative values;
said first and second representative values are hash values and/or message digests of said first and second data sets, respectively; and
said first and second representative values are determined in parallel and/or simultaneously.

16. The computer-implemented method of claim 1, wherein said determining of said second representative value and said determining of said first representative value are respectively performed by first and second processors.

17. The computer-implemented method of claim 11, wherein said first and second processor can be one or more of the following:
a Central Processing Unit (CPU), a Graphical Processing Unit (GPU), a specialized processor, a MMX (or iwMMXT) instruction compliant processor for embedded systems, a Single Instruction Multiple Data processor (SIMD), a Multiple Instruction Multiple Data processor, a Dual Core processor, a Quad-core processor, a Multi Core processor.

18. The computer-implemented method of claim 1, further comprising:
mapping said first and second representative values to first and second integer values, respectively.

19. The computer-implemented method of claim 1, wherein said determining of said second representative value and said determining of said first representative value include evaluating a SHA function.

20. The computer-implemented method of claim 2, wherein the method comprises one or more of the following:

determining based on said first and/or second representative value, a third representative value representative of said data;

concatenating said first and second representative values to determine a third representative value representative of said data; and combining said first and second representative values to determine a third representative value representative of said data.

21. The computer-implemented method of claim 20, wherein said method comprises one or more of the following:

representing said first portion of said data by said first representative value;

representing said second portion of said data by said second representative value representing said data by first and/or second representative values;

representing said data by said third representative value; and authenticating said first, second and/or third representative values.

22. The computer-implemented method of claim 1, wherein said method further comprises:

obtaining said data; and dividing said data into at least said first and second data sets, wherein each of said first and second data sets are further subdivided into a plurality of sub-portions arranged for sequential processing in order to determine said first and second representative values.

23. The computer-implemented method of claim 22, wherein said obtaining of said data includes: receiving, reading, loading and/or determining said data.

24. The computer-implemented method of claim 22, wherein the method further comprises:

wherein said third representative value represents an integrity value for said data, and wherein said data includes for one or more of the following: executable code, an operating system, boot code, a file system, and one or more files.

25. A computer-implemented method for integrity verification of data in a computing device based on one or more integrity values for said data, wherein said computer-implemented method comprises:

determining a number of multiple independent processing streams;

dividing said data into said number of multiple independent processing streams for processing simultaneously and in parallel, wherein said multiple independent processing streams comprise a first data set including one or more data portions of said data in a first arrangement, and a second data set including one or more data portions of said data in a second arrangement, and wherein said first data set and said second data set are of equal or varying sizes, discrete or overlapping;

determining a first hash value for said first data set, wherein said first hash value is based on each data portion of said first data set and said first arrangement;

determining a second hash value for said second data set, wherein said second hash value is based on each data portion of said second data set and said second arrangement, and wherein said second hash value is determined independently from said first hash value, thereby determining two independent hash values simultaneously and in parallel; and determining, based on said first and second hash values, one or more integrity values for said data, wherein said integrity verification of said data is based on said one or more integrity values;

wherein data partition information indicating how to divide said data into said multiple independent processing streams is generated.

26. A computer-implemented method as recited in claim 25, wherein:

said determining of said first hash value and said determining of said second hash value are performed at the same time as a Single Instruction Multiple Data (SIMD) operation; and said data partition information is used for determining how to divide said data in order to determine said first and second hash values.

27. The computer-implemented method of claim 26, wherein said determining of said one or more integrity values comprises one or more of the following:

determining, based on said first and second hash values, an integrity value for said data;

concatenating said first and second hash values to determine a concatenated value as an integrity value for said data;

determining said hash values of said concatenated value as an integrity value for value for said data; and determining an integrity value for said data based on hash values of said first and/or second hash value.

28. A computer-implemented method for integrity verification of data in a computing device based on one or more integrity values for said data, wherein said computer-implemented method comprises:

determining a number of multiple independent processing streams to process simultaneously and in parallel in order to generate simultaneously and in parallel multiple hash values for said data;

dividing said data into said number of multiple independent processing streams, wherein each independent processing stream comprises a corresponding data set including one or more data portions of said data in a corresponding arrangement, and wherein data sets of said multiple independent processing streams are of equal or varying sizes, discrete or overlapping;

process said multiple independent processing streams simultaneously and in parallel in order to generate an independent hash value for each one of said multiple independent processing streams, wherein each independent hash value for each independent processing stream is based on each data portion of a corresponding data set and a corresponding arrangement, and wherein said hash values are independent from one another; and determining, based on said hash values, one or more integrity values for said data, wherein said integrity verification of said data is based on said one or more integrity values;

wherein data partition information indicating how to divide said data into said multiple independent processing streams is generated.

29. The computer-implemented method of claim 28, wherein:

said multiple processing streams are processing using a Single Instruction Multiple Data (SIMD) operation; and said data partition information is used for determining how to divide said data in order to generate said hash values.

30. The computer-implemented method of claim 28, wherein:

said multiple processing streams are each subdivided into sub-portions in accordance with a specific hashing algorithm used; and said sub-portions are processed as data using Single Instruction Multiple Data (SIMD) operation, wherein said single operation is a hashing operation that effectively maps said sub-portions to a hashing values in accordance with said specific hashing algorithm.

31. The computer-implemented method of claim 30, wherein said specific hashing algorithm is of the following: HA VAL, MD2, MD4, MD5, PANAMA, RadioGatun, RIPEMD, RIPEMD-128/256, RIPEMD-160/320, SHA-0, SHA-1, SHA-256/224, SHA-512/384, Tiger (2)-192/160/128, and WHIRLPOOL.

32. The computer-implemented method of claim 30, wherein said computer-implemented method further comprises one or more of the following:

generating data partition information that indicates how to divide said data in order to determine said first and second hash values; and generating integrity value generation information that indicates how to determine said one or more integrity values.

33. A computer-implemented method of verifying the integrity of data, wherein said computer-implemented method comprises:

determining a number of multiple independent processing streams;

determining multiple independent hash values simultaneously and in parallel by dividing said data into said number of multiple independent processing streams, wherein each independent processing stream comprises a corresponding data set including one or more data portions of said data in a corresponding arrangement, wherein data sets of said multiple independent processing streams are of equal or varying sizes, discrete or overlapping, wherein said multiple independent hash values include an independent hash value for each independent processing stream, wherein each independent hash value for each independent processing stream is based on each data of a corresponding data set and a corresponding arrangement, and wherein said multiple independent hash values are independent from one another; and verifying the integrity of said data based on said multiple independent hash values;

wherein data partition information indicating how to divide said data into said multiple independent processing streams is generated.

34. The computer-implemented method of claim 33, wherein:

said verifying of said integrity of said data comprises one or more of the following:

determining, based on said multiple independent hash values, one or more integrity values; and comparing said one or more integrity values to one or more integrity expected values; and said data partition information is used for determining how to divide said data in order to determine said multiple independent hash values.

35. A non-transitory computer readable storage medium including at least executable computer program code embodied in a tangible form for integrity verification of data in a computing device based on representative values for said data, wherein said computer readable medium includes:

executable computer program code for determining a number of multiple independent processing streams;

executable computer program code for dividing said data into said number of multiple independent processing streams for processing simultaneously and in parallel, wherein said multiple independent processing streams comprise a first data set including one or more data portions of said data in a first arrangement, and second data set including one or more data portions of said data in a second arrangement, and wherein said first data set and said second data set are of equal or varying sizes, discrete or overlapping;

executable computer program code for determining a first one-way mapping value for said first data set as a first representative value of said first data set, wherein said first one-way mapping value is not intended to map back to said first data set, and wherein said first one-way mapping value is based on each data portion of said first data set and said first arrangement; and executable computer program code for determining a second one-way mapping value for said second data set as a second representative value of said second data set, wherein said second one-way mapping value is not intended to map back to said second data set, wherein said second one-way mapping value is based on each data portion of said second data set and said second arrangement; and executable computer program code for determining said first and second one-way mapping values at the same time, in parallel and simultaneously;

wherein data partition information indicating how to divide said data into said multiple independent processing streams is generated; and wherein said integrity verification of said data is based on said first representative value and said second representative value.

36. The non-transitory computer readable medium of claim 35, wherein: said data partition information is used for determining how to divide said data in order to recalculate said first and second representative values; and said first and second one-way mapping values are hash values.

* * * * *